(12) United States Patent
Singh et al.

(10) Patent No.: US 7,536,646 B2
(45) Date of Patent: May 19, 2009

(54) SYSTEM AND METHOD FOR CUSTOMIZING USER INTERFACES ON A DOCUMENT PROCESSING DEVICE

(75) Inventors: Harpreet Singh, Orange, CA (US);
Brenda Daos, Mission Viejo, CA (US);
Louis Ormond, Irvine, CA (US);
Marianne Kodimer, Huntington Beach, CA (US)

(73) Assignees: Kabushiki Kaisha Toshiba (JP);
Toshiba Tec Kabushiki Kaisha (JP)

( * ) Notice: Subject to any disclaimer, the term of this patent is extended or adjusted under 35 U.S.C. 154(b) by 409 days.

(21) Appl. No.: 11/453,185

(22) Filed: Jun. 14, 2006

(65) Prior Publication Data

US 2007/0294624 A1    Dec. 20, 2007

(51) Int. Cl.
*G06F 3/00* (2006.01)
*G06F 3/12* (2006.01)
*H04N 1/00* (2006.01)

(52) U.S. Cl. ................... 715/745; 715/744; 715/762; 358/1.1; 358/400

(58) Field of Classification Search ................. 715/744, 715/745, 762; 358/1.1, 400
See application file for complete search history.

(56) References Cited

U.S. PATENT DOCUMENTS

| | | | | |
|---|---|---|---|---|
| 2002/0051161 A1* | 5/2002 | Kanazawa et al. | ......... | 358/1.12 |
| 2004/0125414 A1* | 7/2004 | Ohishi et al. | ................ | 358/402 |
| 2004/0202757 A1* | 10/2004 | Gutwein et al. | ............ | 426/433 |
| 2006/0100011 A1* | 5/2006 | Morrow et al. | ................ | 463/29 |
| 2008/0071835 A1* | 3/2008 | Smadja et al. | ........... | 707/104.1 |

* cited by examiner

*Primary Examiner*—Kieu D. Vu
*Assistant Examiner*—Ting Zhou
(74) *Attorney, Agent, or Firm*—Tucker Ellis & West LLP

(57) ABSTRACT

The subject application is directed to a system and method for customizing a document processor interface. A user successfully logs onto a document processing device and selects to generate a customized graphical user-interface. When the user has previously created such an interface, the device retrieves stored selection data associated with the user and uses such data to selectively generate a customized interface. To create the customized interface, the user first selects desired functions to be displayed. The selected functions are then stored in association with user identification information by the device. A tangible output document is capable of being generated inclusive of encoded indicia representing selection data and user identification information. Subsequent scanning of the tangible output document by the device, or another document processing device, enables the scanning device to authenticate the user and generate a customized interface in accordance with the selection data contained in the encoded indicia.

12 Claims, 6 Drawing Sheets

SYSTEM AND METHOD FOR CUSTOMIZING USER INTERFACES ON A DOCUMENT PROCESSING DEVICE

BACKGROUND OF THE INVENTION

The subject application is directed to a system and method for customizing user interfaces on a document processing device. In particular, the subject application is directed to a system and method for generating a customized user interface for a user that will provide only the specific functionalities accessed by the user on such interface.

Document processing devices, such as multifunction peripheral devices, typically offer a multitude of document processing services or functions. The document processing device will generally have a user interface associated therewith which displays information about the services offered by the device to the user. Such user interface may be difficult for a user to navigate successfully if the user is not familiar with the device or if the device offers many services such that the user has to navigate through several screens to access the desired service. Generally, a user of a document processing device will access the same set of services or functions repeatedly. As such, the user will have to repeat the extended process of navigating through undesired services before accessing the user's desired service, thereby spending valuable time each time the user must perform the desired document processing operation. It would be advantageous to have a system and method for customizing a user interface such that those services or functions frequently accessed by a user would be easier to access.

The subject application overcomes the above noted problems and provides a system and method for generating a customized user interface for a user that will provide only the specific functionalities accessed by the user on such interface.

SUMMARY OF THE INVENTION

In accordance with the subject application, there is provided a system and method for customizing user interfaces on a document processing device.

Further, in accordance with the subject application, there is provided a system and method for customizing a user interface such that those services or functions frequently accessed by a user would be easier to access.

Still further, in accordance with the subject application, there is provided a system and method for generating a customized user interface for a user that will provide only the specific functionalities accessed by the user on such interface.

Still further, in accordance with the subject application, there is provided a system for customizing a document processor interface. The system comprises input means adapted for receiving identification data from an associated user. The system also comprises display means, which display means are adapted for generating a default display upon an initial receipt of identification from the associated user and for generating a display representative of a plurality of functions of an associated document processing device. The system further comprises means adapted for generating a prompt on the display representative of an option to generate a customized user interface, means adapted for receiving, from the associated user, instruction data associated with a commencement of customized user interface creation and selection data which corresponds to selected of the plurality of functions, and storage means adapted for storing the selection data and identification data corresponding thereto. The system also includes means adapted for generating a customized interface corresponding to the selection data on the display means and means adapted for generating the customized interface on the display means upon subsequent receipt of identification data from the associated user via the input means. The input means also includes means adapted for receiving reset instruction data from the associated user. The system further comprises means adapted for generating the default display on the display means upon receipt of a reset instruction.

Preferably, the identification data includes at least one of a username, password, and department code.

In one embodiment, the storage means includes means adapted for storing a plurality of sets of selection data corresponding to the identification data. In addition, the system further comprises means adapted for generating a selected one of a plurality of alternative customized interfaces on the display means.

In another embodiment, the system also includes means adapted for testing the identification data to determine if it corresponds to at least one subset of users and means adapted for selectively generating at least a portion of the customized interface to reflect common functions of the plurality thereof shared by the at least one subset of users.

In yet another embodiment, the system also includes means adapted for generating a tangible document including encoded indicia thereon upon receipt of the identification information and scanning means adapted for scanning indicia on the tangible document. The system further includes means adapted for receiving the tangible document containing the indicia at a second document processor and means adapted for selectively generating the customized interface on the display means of the second document processor in accordance with an output of the scanning means.

Still further, in accordance with the subject application, there is provided a method for customizing a document processor interface in accordance with the system set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawing and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed a system and method for customizing user interfaces on a document processing device. In particular, the subject application is directed to a system and method for customizing a user interface such that those services or functions frequently accessed by a user would be easier to access. More particularly, the subject application is directed to a system and method for generating a customized user interface for a user that will provide only the specific functionalities accessed by the user on such interface.

Figure 1:
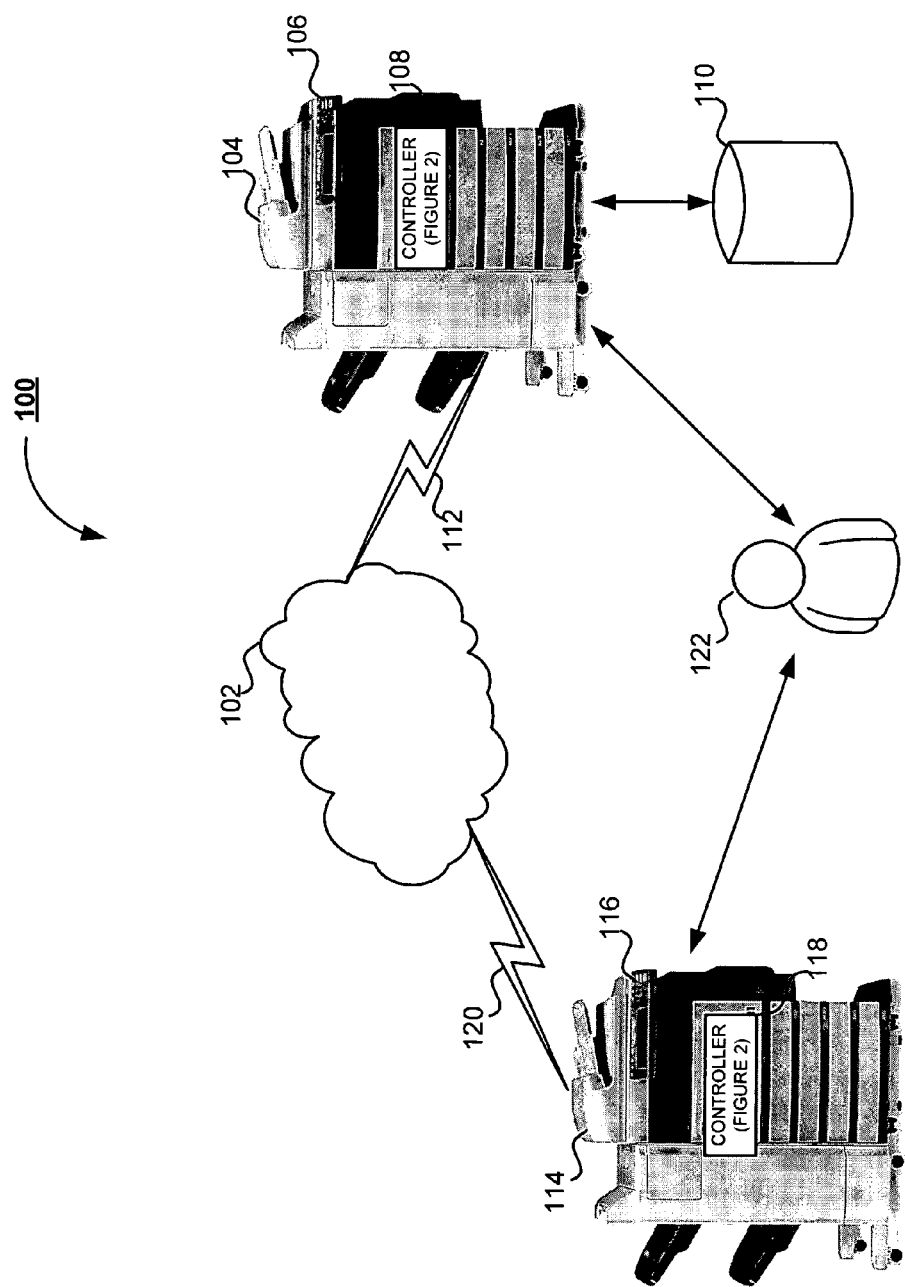
FIG. 1 is an overall diagram of the system for customizing a document processor interface according to the subject application.

Turning now to FIG. 1, there is shown an overall diagram of the system 100 for customizing a document processor interface in accordance with the subject application. As shown in FIG. 1, the system 100 employs a distributed computing environment, represented as a computer network 102. It will be appreciated by those skilled in the art that the computer network 102 is any distributed communications environment known in the art capable of enabling the exchange of data between two or more electronic devices. Those skilled in the art will further appreciate that the network 102 is any computer network known in the art including, for example and without limitation, a virtual area network, a local area network, a personal area network, the Internet, an intranet, a wide area network, or any suitable combination thereof. Preferably, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms.

The system 100 depicted in FIG. 1 further includes a first document processing device 104, represented as a multifunction peripheral device, suitably adapted to perform a variety of document processing operations. The skilled artisan will understand that such document processing operations include, for example and without limitation, copying, scanning, electronic mail, document management, facsimile, printing, and the like. Suitable commercially available document processing devices include, but are not limited to, the Toshiba e-Studio Series Controller. In one embodiment, the first document processing device 104 is suitably equipped to receive a plurality of portable storage media, including without limitation, Firewire drive, USB drive, SD, MMC, XD, Compact Flash, Memory Stick, and the like. In the preferred embodiment of the subject application, the first document processing device 104 further includes an associated user-interface 106, such as a touch-screen interface, an alpha-numeric interface, an LCD display, or the like, via which an associated user is able to interact directly with the document processing device 104. In accordance with the subject application, the first document processing device 104 further incorporates a controller 108, suitably adapted to facilitate the operations of the first document processing device 104, as will be understood by those skilled in the art. Preferably, the controller 108 is embodied as hardware, software, or any suitable combination thereof, configured to control the operations of the associated document processing device 104, control the display of images via the user-interface 106, and the like. The functioning of the controller 108 will better be understood in conjunction with the block diagrams illustrated in FIGS. 2 and 3, explained in greater detail below.

Communicatively coupled to the first document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store information relative to the customized user-interface screens, home pages, settings, or the like, associated with a particular user's identification information. In addition, the data storage device 110 is further capable of storing some or all of a particular customized graphical user-interface associated with an individual user 122, or a subset of users, such as a group, division, department, or the like. It will be appreciated by those skilled in the art that while illustrated in FIG. 1 as being a separate component of the system 100, the data storage device 110 is capable of being implemented as internal storage of the document processing device 104, such as, for example and without limitation, an internal hard disk drive, or the like.

Preferably, the first document processing device 104 is communicatively coupled to the computer network via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one aspect of the subject application, the system 100 illustrated in FIG. 1 further includes a second document processing device 114, represented as a multifunction peripheral device. Similar to the first document processing device 104, the skilled artisan will appreciate that the second document processing device 114 is capable of performing a variety of document processing operations, including, for example and without limitation, document management, facsimile, printing, copying scanning, electronic mail, and the like. Suitable commercially available document processing devices include, but are not limited to, the Toshiba e-Studio Series Controller. In one embodiment of the subject application, the second document processing device 114 includes an associated user-interface 116, such as a touch-screen interface, an alpha-numeric interface, an LCD display, or the like, via which an associated user is able to interact directly with the second document processing device 114. The skilled artisan will appreciate that the second document processing device 114 is capable of being equipped to receive a plurality of portable storage media, such as, for example and without limitation, Compact Flash, Memory Stick, MMC, XD, SD, USB drives, Firewire drives, and the like.

The second document processing device 114 further incorporates a controller 118, suitably configured to control operations of the document processing device 114, image display on the user-interface 116, receipt of user instructions, and the like. The skilled artisan will appreciate that the controller 118 is any hardware, software, or suitable combination thereof capable of facilitating the control of the document processing device 114 in accordance with the subject application. The functioning of the controller 118, similar to that of the controller 108, will better be understood in conjunction with the block diagrams illustrated in FIGS. 2 and 3, explained in greater detail below. Preferably, the second document processing device 114 is communicatively coupled to the computer network via a suitable communications link 120. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

Figure 2:
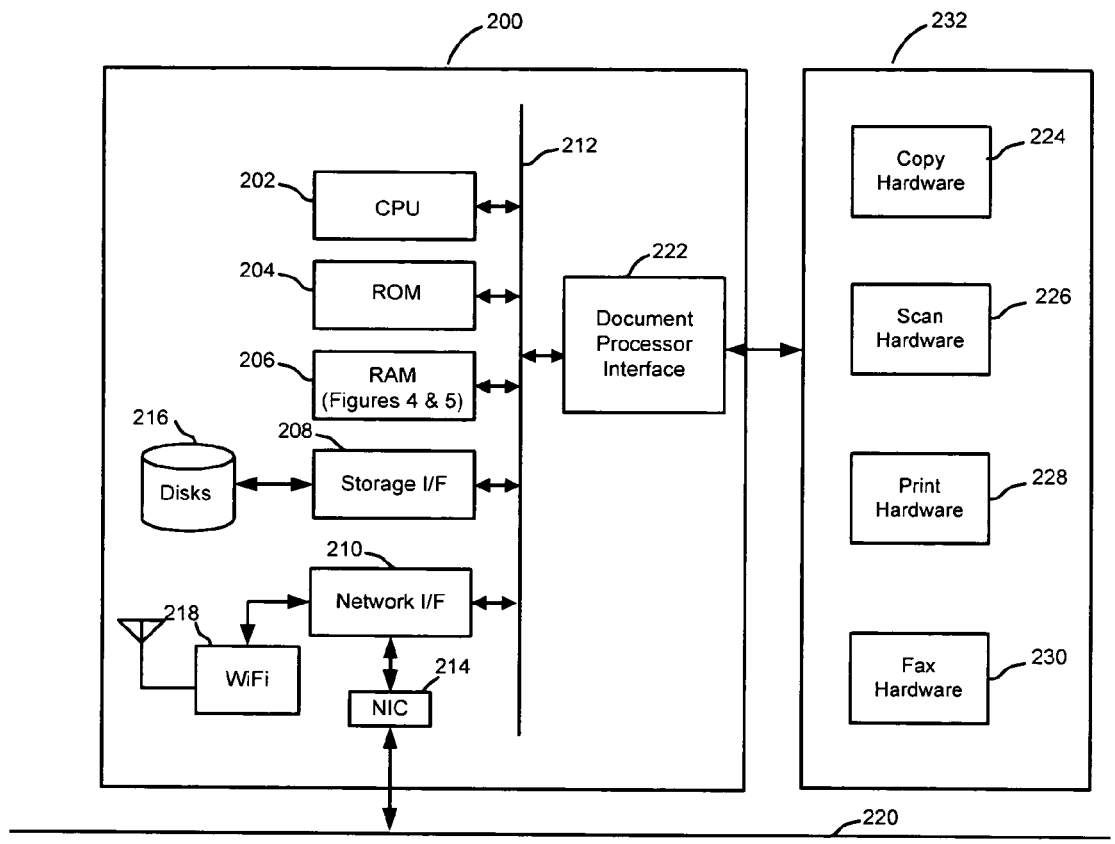
FIG. 2 is a block diagram illustrating controller hardware for use in the system for customizing a document processor interface according to the subject application.

Turning now to FIG. 2, illustrated is a representative architecture of a suitable controller 200 on which operations of the subject system 100 are completed. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
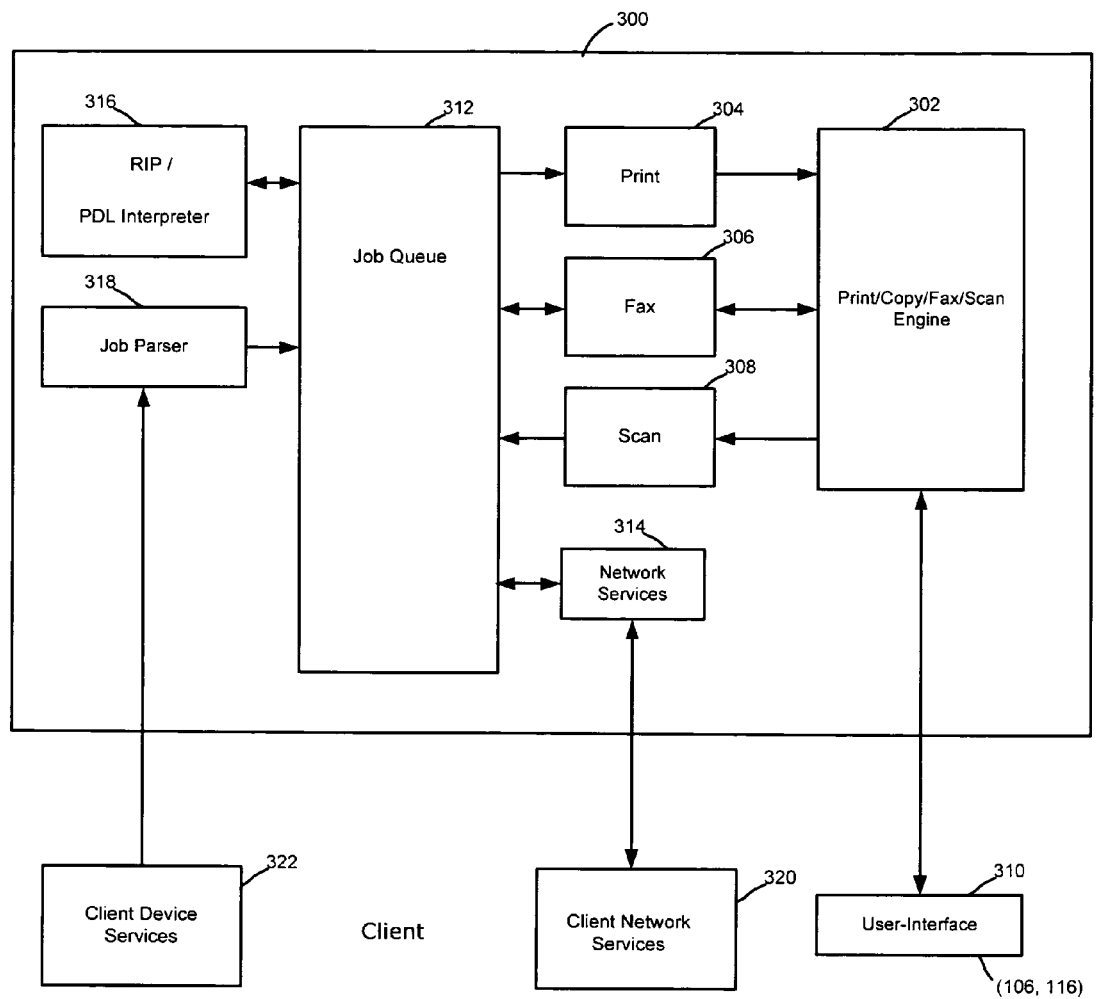
FIG. 3 is a functional block diagram illustrating the controller for use in the system for customizing a document processor interface according to the subject application.

Functionality of the subject system is accomplished on a suitable document processing device 104 that includes the controller 200 of FIG. 2 as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the afore-described functionality and components.

In operation, a user 122 inputs user identification data at the first document processing device 104 comprising a user ID/password, group identification number, department code, or the like. The skilled artisan will appreciate that such user identification data is advantageously input to the first document processing device 104 via the associated user-interface 106. The controller 108 then accesses the data storage device 110 and determines if the user identification data is associated with a subset of users. As will be appreciated by those skilled in the art, the controller 108 is suitably adapted to control images displayed on the user-interface 106, such that the user-interface 106 displays a graphical user-interface corresponding to the functionality of the associated document processing device 104. When it is determined that the user identification data received is associated with a subset of users, for example a department or office group/division, the controller 108 retrieves, from the data storage device 110, a portion of a customized user-interface with particular document processing functions associated therewith. Preferably, this customized user-interface is then displayed to the user 122 via the user-interface 106 for further operations in accordance with the subject application.

When the received user identification data is not associated with any group or subset of users, a determination is made by the controller 108 whether the identification data is associated with a previously created customized user-interface. Preferably, the controller 108 accesses the data storage device 110 and attempts to locate any customized displays associated with the received user identification data. When such a corresponding customized user-interface is located in the data storage device 110, the controller 108 facilitates the display of this user-interface via the user-interface 106 for the associated user 122. When no such link is found, a default display is generated by the controller 108 and illustrated to the user 122 on the user-interface 106. In accordance with the subject application, the default display is capable of including graphical representations of document processing operations, such as, for example and without limitation, a copy icon, a print icon, a scan icon, a facsimile icon, a scan-to-storage icon, a scan-to-electronic mail icon, or the like.

A prompt is then displayed to the user 122 by the controller 108 using the user-interface and querying the user 122 whether or not a customized user-interface is to be created. When the user 122 negates this prompt, i.e., selects not to create such an interface, the controller 108 returns the display of the user-interface to the default screen. When the user 122 elects to create a customized interface, the user 122 then selects those functions, offered by the document processing device 104, to be included in the customized user-interface. That is, the user 122 selects one or more functions that will be displayed in subsequent logins to the document processing device 104 associated with the user 122. Once these functions have been selected by the user 122, the controller 108 saves the selection data, i.e., selected functions, in the data storage device 110 in association with the received user identification data. A customized user-interface is then generated by the controller 108 on the user-interface 106 corresponding to the selection data. It will be appreciated by those skilled in the art that the user 122 is able to reset the display of the user-interface 106 to the default display by selecting a reset icon, suitably displayed on the user-interface 106.

In accordance with one embodiment of the subject application, the user 122 is able to select a scan-to-login output document from the document processing device 104, whereupon a tangible document is to be generated incorporating encoded user identification data and selection data. It will be appreciated by those skilled in the art that such a tangible document is advantageously used to facilitate ease of login and customization for the user 122 when using the first document processing device 104 or the second document processing device 114, as will be explained in greater detail below. Preferably, the tangible output document includes encoded indicia representing the user 122, the user identification data, the selection data, and the like.

The preceding generation of the tangible output will better be understood when viewed from the second document processing device 114 point-of-view. Thus, the second document processing device 114 receives the tangible document including the encoded indicia from the user 122. It will be appreciated by those skilled in the art that the second document processing device 114 preferably receives the tangible document via an automatic document feeder, or placement directly on a scanning surface of the device 114. The document is then scanned by the document processing device 114 to generate electronic data representing the scanned document.

The controller 118 associated with the second document processing device 114 then determines whether the encoded indicia is recognizable. When the indicia is not recognized by the controller 118, or no indicia was located, the operation terminates. It will be appreciated by those skilled in the art that the controller 118 then generates, in response to the termination of the operation, a default display on the user-interface 116. When the indicia is recognized by the controller 118, the scanned data is analyzed to decode the encoded indicia representing the user 122, the user identification data, and the selection data. The controller 118 associated with the second document processing device 114 then selectively generates a customized user-interface based on the selection data via the user-interface 116. The skilled artisan will appreciate that the tangible document is capable of being used for subsequent document processing operations via the second document processing device 114, the first document processing device 104, or other document processing devices (not shown) to which the user 122 requests document processing operations. It will be apparent to those skilled in the art that the second document processing device 114 is also capable of including a data storage device (not shown), such that subsequent logins of the user 122 to the second document processing device 114 do not require the use of a tangible document, but rather retrieve the customized user-interface from such a data storage device.

Figure 4:
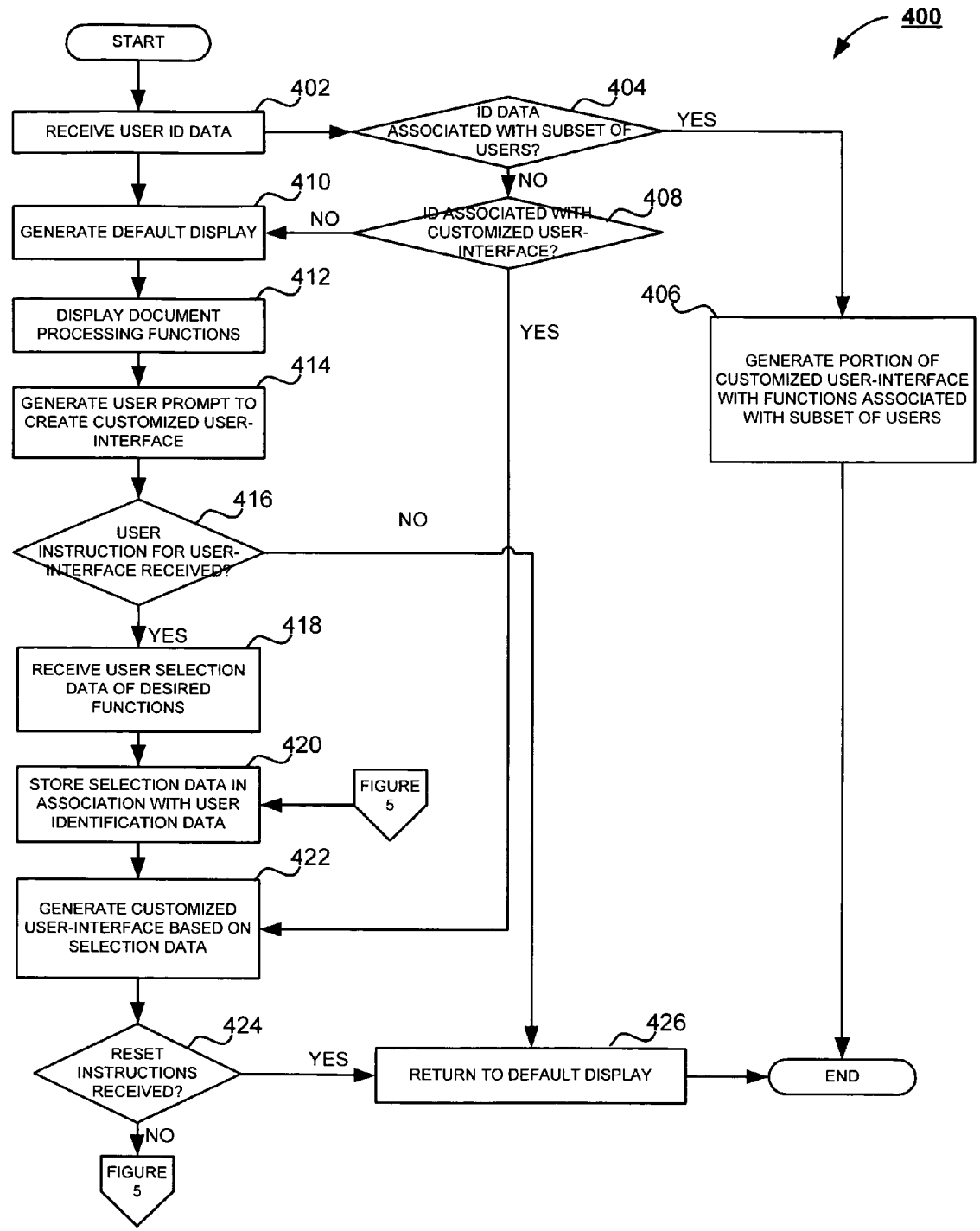
FIG. 4 is a flowchart illustrating the method for customizing a document processor interface on a second document processing device according to the subject application.
Figure 5:
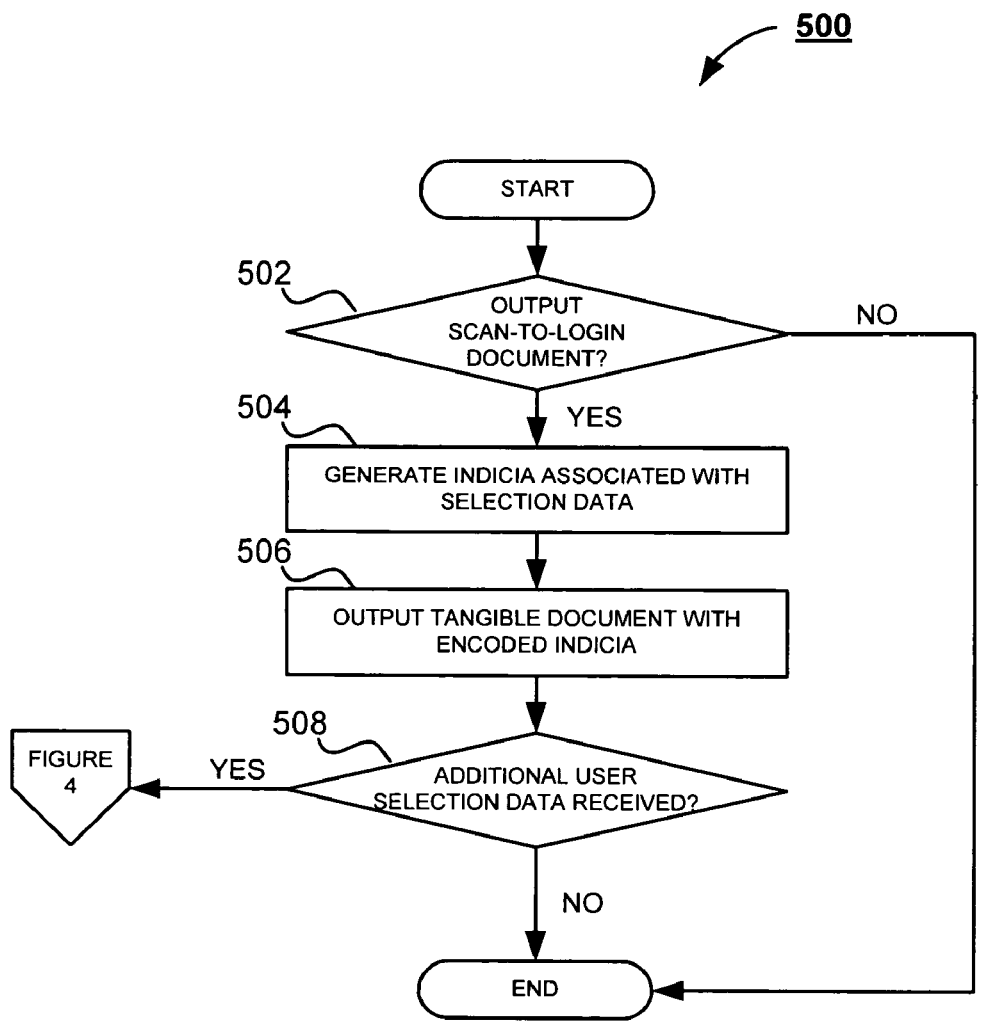
FIG. 5 is a flowchart illustrating the method for customizing a document processor interface on a second document processing device according to the subject application.
Figure 6:
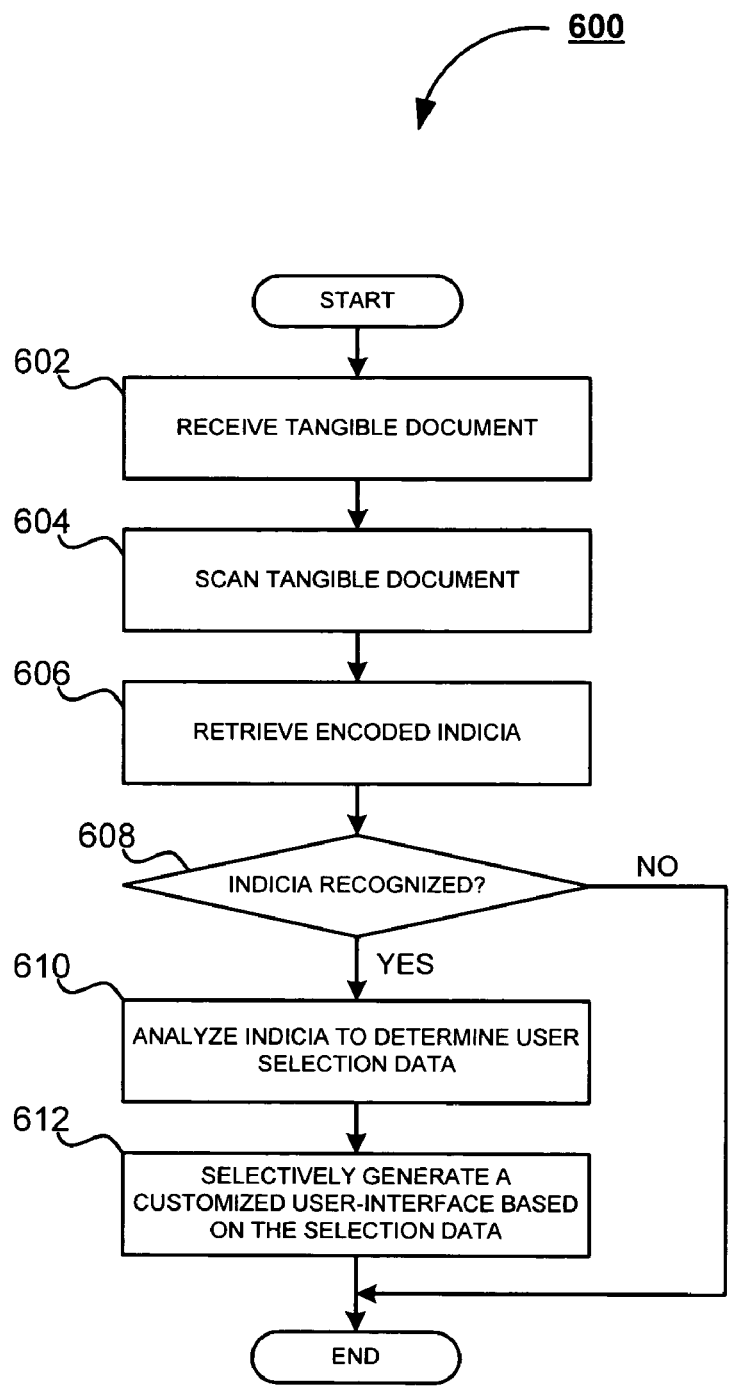
FIG. 6 is a flowchart illustrating the method for customizing a document processor interface on a second document processing device according to the subject application.

The foregoing diagrams of FIGS. 1, 2, and 3 will better be understood when viewed in conjunction with the methodology embodied in FIGS. 4, 5, and 6. Referring now to FIG. 4, there is shown a flowchart 400 illustrating a method for customizing a document processor interface on a first document processing device 104 in accordance with the subject application. Beginning at step 402, the first document processing device 104 receives user identification data representative of the identity of the user 122. Preferably, this user identification data, or login data, includes, for example and without limitation, a user ID/password, a department code, a group code, or the like. A determination is then made by the controller 108 of the first document processing device 104 whether the identification data is associated with a subset of users at step 404. In accordance with the preferred embodiment of the subject application, the controller 108 searches the data storage device 110 for an associated subset of users to which the identification data corresponds. When such a link is located by the controller 108, flow proceeds to step 406, whereupon a portion of a customized user-interface is generated with the set of common functions associated with the subset of users. It will be understood by those skilled in the art that the set of common functions associated with the subset of users is capable of being preset by a network administrator, or the like.

When it is determined at step 404 that the user 122 is not associated with a given subset of users, flow proceeds to step 408, whereupon a determination is made by the controller 108 whether the identification data corresponds to a previously generated customized user-interface. In accordance with one aspect of the subject application, the controller 108 searches the data storage device 110 for a customized user-interface associated with the user 122 providing the identification data. When such a link is located, flow proceeds to step 422, whereupon a customized user-interface is generated on the user-interface 106.

When no such association is found by the controller at step 408, flow proceeds to step 410, whereupon the controller 108 generates, via the user-interface 106, a default display. At step 412, the display is modified so as to present to the user 122 the document processing functions supported by the document processing device 104. It will be appreciated by those skilled in the art that such display advantageously includes, for example and without limitation, graphical representations of a copy function, a scan function, a print function, a facsimile function, a scan-to-email function, a scan-to-storage function, a document management function, and the like.

A user prompt is then generated by the controller 108, via the user-interface 106 at step 414, to create a customized user-interface for display to the user 122 upon login at the document processing device 104. A determination is then made at step 416 whether the controller 108 has received instructions from the user 122 for a customized user-interface. When no such instruction is received, flow proceeds to step 426, whereupon the default display is returned to the screen of the user-interface 106.

When the user 122 has indicated to the controller 108, via any suitable means known in the art, that a customized user-interface is desired, flow proceeds to step 418, wherein the user 122 selects one or more functions to be displayed on the customized user-interface. The skilled artisan will appreciate that the selection of functions is dependent upon the needs and desires of the user 122 customizing the user-interface. Thus, the user 122 is able to select from among the services offered by the document processing device 104 those functions to be displayed on the customized user-interface at login. Once the user 122 has made the desired selections, flow proceeds to step 420, whereupon the selection data, representing the selected functions, is stored in the data storage device 110 in association with the received identification data. Preferably, the controller 108 facilitates the association and storage of the selection data on the data storage device 110. The controller 108 then generates, via the user-interface 106 associated with the first document processing device 104, a customized user-interface in accordance with the user 122 selection data, as shown at step 422.

The skilled artisan will appreciate that the user 122 is able to selectively return to the default user-interface from the customized user-interface by selecting the reset function. Preferably, this function is capable of being represented as either or both of a graphical reset icon and a hardware button/switch/toggle located on the user-interface 106. Therefore, a determination is made by the controller 108 at step 424 whether a reset instruction has been received from the associated user 122. When the reset function has been selected by the user 122, the controller 108 directs the user-interface 106 to return from the customized user-interface to the default user-interface at step 426.

When no instruction is received from the user at step 122, flow proceeds from step 424 of FIG. 4 to step 502 of FIG. 5. Turning now to FIG. 5, there is shown a flowchart 500 illustrating a methodology for generating a scan-to-login output sheet according to the method for customizing a document processor interface on a second document processing device according to the subject application. Beginning at step 502, the controller 108 determines whether an output scan-to-login document is required. That is, the controller 108 of the first document processing device 104 determines whether or not to output a tangible document containing user identification data, login data, selection data, and the like. When no such document is requested or required by the user 122, the controller 108 terminates the method described in FIG. 5, thereby allowing the user 122 to request desired document processing operations via the customized user-interface of the user-interface 106.

When it is determined by the controller at step 502 that an output scan-to-login document is requested or required, flow proceeds to step 504, whereupon encoded indicia, representative of data to be included on the document is generated. Preferably, the encoded indicia includes data representing the user's 122 identification data, the selection data corresponding to the customized user-interface, and other data, as will be appreciated by those skilled in the art. As the skilled artisan will understand, the encoded indicia is capable of implementation as, for example and without limitation, a barcode, a watermark, a glyph, or other computer-readable image or text known in the art. The encoded indicia is then incorporated into a tangible output document, which is output by the first document processing device 104 at step 506. A determination is then made by the controller 108 at step 508 whether additional user selection data has been received, i.e., whether the user 122 has made further changes to the customized user-interface. When no such data is detected, the controller 108 proceeds to terminate the method of FIG. 5, thereby enabling the processing of the document requests from the user 122 via the first document processing device 104. When such additional selection data is detected by the controller 108, flow returns from step 508 of FIG. 5 to step 420 of FIG. 4, whereupon the additional selection data is stored on the data storage device 110 in association with the user identification information.

It will be appreciated by those skilled in the art that subsequent logins of the user 122 on the first document processing device 104 will result in the automatic display of the customized user-interface. In addition, the skilled artisan will appreciate that the user 122 is capable of creating multiple customized interfaces for display using a secondary department code or the like. For example, the user 122 is capable of creating a first interface associated with the copy and print functionality of the document processing device 104 and a second interface associated with the facsimile and electronic mail functionality of the document processing device 104. Thus, the user 122 logs onto the document processing device 104 via the user-interface 106 and inputs a department code or other identifier, which designates either the first interface or the second interface.

Having thus explained one embodiment for generating a customized user-interface on the first document processing device 104, attention now turns to the generation of a customized user-interface on a second document processing device 114, using the selection data received from the user 122. Turning now to FIG. 6, there is shown a flowchart 600 illustrating the method for customizing a document processor interface on a second document processing device 114 in accordance with the subject application. Beginning at step 602, the second document processing device 114 receives the tangible document containing encoded indicia thereon. Such receipt, as will be understood by those skilled in the art, is capable of being accomplished by placement of the document on an automated document feeder, a flatbed scanner, or the like. The controller 118 then directs the scanning component of the second document processing device 114 to scan the tangible document at step 604. At step 606, the encoded indicia contained on the tangible document are retrieved by the controller 118.

A determination is then made at step 608 whether the encoded indicia is recognized by the controller 118 of the second document processing device 114. When the indicia is not recognized by the controller 118, or no indicia was located, the operation terminates. Preferably, once this termination occurs, a default display is generated via the user-interface 116 and the user 122 is able to interact with the second document processing device 114 using the default interface thereafter. When the indicia is recognized by the controller 118 at step 608, flow proceeds to step 610 for analysis of the encoded indicia. Thus, the encoded indicia are then analyzed at step 610 to determine the user selection data corresponding to the user 122 selections of functions and options for a customized user-interface. At step 612, the controller 118 then selectively generates, via the user-interface 116, a customized user-interface based on the selection data. Thereafter, the user 122 is effectively logged onto the second document processing device 114 and is able to request document processing operations, as displayed on the customized user-interface, from the second document processing device 114.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for customizing a document processor interface comprising:
   input means adapted for receiving identification data from an associated user;
   display means adapted for generating a default display upon an initial receipt of identification from the associated user;
   the display means including means adapted for generating a display representative of a plurality of functions of an associated document processing device;
   means adapted for generating a prompt on the display representative of an option to generate a customized user interface;
   means adapted for receiving, from the associated user, instruction data associated with a commencement of customized user interface creation;
   means adapted for receiving, from the associated user, selection data which corresponds to selected of the plurality of functions;
   storage means adapted for storing the selection data and identification data corresponding thereto;
   means adapted for generating a customized interface corresponding to the selection data on the display means;
   means adapted for generating the customized interface on the display means upon subsequent receipt of identification data from the associated user via the input means; and
   means adapted for printing a tangible output document inclusive of indicia corresponding to encoded data representative of the customized interface and transporting the tangible output document to another document processing device so as to read and decode the indicia of the tangible output document to generate the customized interface thereon.

2. The system for customizing a document processor interface of claim 1 wherein the identification data includes at least one of a username, password, and department code.

3. The system for customizing a document processor interface of claim 2 wherein the storage means includes means adapted for storing a plurality of sets of selection data corresponding to the identification data, and further comprising means adapted for generating a selected one of a plurality of alternative customized interfaces on the display means.

4. The system for customizing a document processor interface of claim 2 further comprising:
   means adapted for testing the identification data to determine if it corresponds to at least one subset of users; and
   means adapted for selectively generating at least a portion of the customized interface to reflect common functions of the plurality thereof shared by the at least one subset of users.

5. A method of customizing a document processor interface comprising the steps of:
   receiving identification data from an associated user;
   generating a default display upon an initial receipt of identification from the associated user;
   generating a display representative of a plurality of functions of an associated document processing device;
   generating a prompt on the display representative of an option to generate a customized user interface;

receiving, from the associated user, instruction data associated with a commencement of customized user interface creation;

receiving, from the associated user, selection data which corresponds to selected of the plurality of functions;

storing the selection data and identification data corresponding thereto;

generating a customized interface corresponding to the selection data on an associated display;

generating the customized interface on the associated display upon subsequent receipt of identification data from the associated user; and printing a tangible output document inclusive of indicia corresponding to encoded data representative of the customized interface and transporting the tangible output document to another document processing device so as to read and decode the indicia of the tangible output document to generate the customized interface thereon.

6. The method for customizing document processor interface of claim 5 wherein the identification data includes at least one of a username, password, and department code.

7. The method for customizing a document processor interface of claim 6 further comprising the steps of:

storing a plurality of sets of selection data corresponding to the identification data; and generating a selected one of a plurality of alternative customized interfaces on the display.

8. The method for customizing a document processor interface of claim 6 further comprising the steps of:

testing the identification data to determine if it corresponds to at least one subset of users; and selectively generating at least a portion of the customized interface to reflect common functions of the plurality thereof shared by the at least one subset of users.

9. A computer-implemented method for customizing a document processor interface comprising the steps of:

receiving identification data from an associated user;

generating a default display upon an initial receipt of identification from the associated user;

generating a display representative of a plurality of functions of an associated document processing device;

generating a prompt on the display representative of an option to generate a customized user interface;

receiving, from the associated user, instruction data associated with a commencement of customized user interface creation;

receiving, from the associated user, selection data which corresponds to selected of the plurality of functions;

storing the selection data and identification data corresponding thereto;

generating a customized interface corresponding to the selection data on an associated display;

generating the customized interface on the associated display upon subsequent receipt of identification data from the associated user; and printing a tangible output document inclusive of indicia corresponding to encoded data representative of the customized interface and transporting the tangible output document to another document processing device so as to read and decode the indicia of the tangible output document to generate the customized interface thereon.

10. The computer-implemented method for customizing document processor interface of claim 9 wherein the identification data includes at least one of a username, password, and department code.

11. The computer-implemented method for customizing a document processor interface of claim 10 further comprising the steps of:

storing a plurality of sets of selection data corresponding to the identification data; and generating a selected one of a plurality of alternative customized interfaces on the display.

12. The computer-implemented method for customizing a document processor interface of claim 10 further comprising the steps of:

testing the identification data to determine if it corresponds to at least one subset of users; and selectively generating at least a portion of the customized interface to reflect common functions of the plurality thereof shared by the at least one subset of users.

* * * * *